(12) United States Patent
Ito et al.

(10) Patent No.: US 8,831,830 B2
(45) Date of Patent: Sep. 9, 2014

(54) VEHICLE CONTROLLING SYSTEM

(75) Inventors: Koji Ito, Nagoya (JP); Hiroshi Tsujii, Mishima (JP); Masaki Matsunaga, Ashigarakami-gun (JP); Nobukazu Ueki, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 550 days.

(21) Appl. No.: 13/058,692

(22) PCT Filed: May 19, 2010

(86) PCT No.: PCT/JP2010/058452
§ 371 (c)(1),
(2), (4) Date: Feb. 11, 2011

(87) PCT Pub. No.: WO2011/145190
PCT Pub. Date: Nov. 24, 2011

(65) Prior Publication Data
US 2012/0029746 A1    Feb. 2, 2012

(51) Int. Cl.
*B60W 10/30* (2006.01)
*B60L 1/00* (2006.01)

(52) U.S. Cl.
USPC ............................................. 701/41; 701/22

(58) Field of Classification Search
CPC ...... B60K 25/00; B60W 20/00; B60W 10/30; B60W 2710/0644; B60W 50/085; Y02T 10/6286; Y02T 90/16; B60L 1/003; B60L 1/00; F02N 11/003; B62D 5/00; B62D 5/0481
USPC ................. 701/22, 41–44, 86, 99; 180/65.28, 180/65.285, 65.29, 65.22; 903/903, 904, 903/907, 930

See application file for complete search history.

(56) References Cited

U.S. PATENT DOCUMENTS 3,225,704 A    12/1965 Gilvar et al.
3,254,608 A     6/1966 Alden
(Continued)

FOREIGN PATENT DOCUMENTS

DE         103 07 462 A1    9/2004
DE     10 2007 035 424 A1    1/2009
(Continued)

OTHER PUBLICATIONS

International Search Report PCT/JP2010/058452, Jun. 29, 2010.
(Continued)

*Primary Examiner* — Jason Holloway
(74) *Attorney, Agent, or Firm* — Sughrue Mion, PLLC

(57) ABSTRACT

A vehicle controlling system starts an engine by a starting device based on a vehicle speed, and changes a predetermined vehicle speed, which is a vehicle speed when the engine is started, in response to a state of an electric storage device, when an execution of inertial running in which the engine is stopped to allow the vehicle to run with inertia. Power consumed by a power steering device is changed in response to a vehicle speed. The predetermined vehicle speed is a lower limit vehicle speed in a vehicle speed range in which the electric storage device can output power consumed by the starting device when the engine is started and power consumed by the power steering device at the same time, or a vehicle speed close to the lower limit vehicle speed in the vehicle speed range.

7 Claims, 8 Drawing Sheets

(56) References Cited

U.S. PATENT DOCUMENTS

| | | | |
|---|---|---|---|
| 3,532,060 A | 10/1970 | Brush | |
| 6,048,288 A * | 4/2000 | Tsujii et al. | 477/5 |
| 2002/0079147 A1 | 6/2002 | Yamaguchi et al. | |
| 2002/0131621 A1 | 9/2002 | Ohta | |
| 2003/0221882 A1 | 12/2003 | Long | |
| 2004/0079342 A1 | 4/2004 | Kojima et al. | |
| 2005/0014605 A1 | 1/2005 | Ries-Mueller | |
| 2005/0137769 A1 | 6/2005 | Takamatsu et al. | |
| 2005/0209747 A1 | 9/2005 | Yakes et al. | |
| 2006/0030450 A1 | 2/2006 | Kyle | |
| 2006/0213703 A1 | 9/2006 | Long | |
| 2006/0228000 A1 | 10/2006 | Miyajima et al. | |
| 2007/0288131 A1 | 12/2007 | Yakes et al. | |
| 2008/0065285 A1 | 3/2008 | Yakes et al. | |
| 2008/0189040 A1 | 8/2008 | Nasu et al. | |
| 2010/0107921 A1 | 5/2010 | Kakinuma et al. | |
| 2010/0137100 A1 | 6/2010 | Kojima et al. | |
| 2010/0222965 A1 | 9/2010 | Kimura et al. | |
| 2010/0301668 A1 | 12/2010 | Yakes et al. | |
| 2011/0212804 A1 | 9/2011 | Imamura et al. | |
| 2011/0295453 A1 * | 12/2011 | Betz et al. | 701/22 |
| 2011/0307130 A1 * | 12/2011 | Gow et al. | 701/22 |
| 2011/0320078 A1 * | 12/2011 | McGill | 701/22 |
| 2012/0031688 A1 | 2/2012 | Safranski et al. | |
| 2012/0323473 A1 | 12/2012 | Irie et al. | |
| 2013/0060444 A1 | 3/2013 | Matsunaga et al. | |

FOREIGN PATENT DOCUMENTS

| | | |
|---|---|---|
| JP | 11-002143 A | 1/1999 |
| JP | 2002-227885 A | 8/2002 |
| JP | 2003-153402 A | 5/2003 |
| JP | 2005-088703 A | 4/2005 |
| JP | 2005-351202 A | 12/2005 |
| JP | 2006-161684 A | 6/2006 |
| JP | 2007-187090 A | 7/2007 |
| JP | 2007-255271 A | 10/2007 |
| JP | 2007-291919 A | 11/2007 |
| JP | 2008-018761 A | 1/2008 |
| JP | 2008-254587 A | 10/2008 |
| JP | 2008-260384 A | 10/2008 |
| JP | 2009-227094 A | 10/2009 |

OTHER PUBLICATIONS

International Search Report for corresponding International Patent Application No. PCT/JP2010/058452 mailed Jun. 29, 2010.
Decision of Patent Grant dated Jun. 5, 2012, for JP Application 2010-545308 with English Translation.
Internal Search Report dated Aug. 24, 2010 issued in corresponding PCT application No. PCT/JP/2010/058130.
Office Action dated Nov. 29, 2013 issued in corresponding U.S. Appl. No. 13/697,145.
Office Action dated Mar. 20, 2014 issued in corresponding U.S. Appl. No. 13/697,145.
U.S. Non-Final Office Action dated Jul. 7, 2014, issued in corresponding U.S. Appl. No. 13/697,145.

* cited by examiner

VEHICLE CONTROLLING SYSTEM

FIELD

The present invention relates to a vehicle controlling system.

BACKGROUND

Conventionally, there is known a technology of a power steering device for applying assist torque for assisting a steering operation to a steering device by consuming power from an electric storage device. There is also known a technology for automatically starting an engine by a starting device in a vehicle capable of automatically stopping an engine based on previously determined conditions while the engine is stopped.

For example, Patent Literature 1 discloses a technology of a vehicle control device including an economical run control unit for performing an economical run control for temporarily stopping an engine when predetermined stop conditions are satisfied and an electrically driven power steering control unit for applying a steering assisting power to a steering system by driving a motor.

CITATION LIST

Patent Literature

Patent Literature 1: Japanese Patent Application Laid-open No. 2009-227094

SUMMARY

Technical Problem

In a vehicle mounted with a power steering device and capable of traveling while an engine is stopped, there is a case in which a starting device automatically starts the engine based on travel conditions and the like while the vehicle is traveling with the engine being stopped. In the vehicle, when the power steering device and the starting device are operated by power from a common electric storage device, there is a possibility that a power request to the electric storage device from the starting device overlaps a power request from the power steering device to the electric storage device. Although an electric storage device is a large capacity electric storage device, which can supply power to the starting device and the power steering device at the same time, the large capacity electric storage device has problems such as its increased weight. It is desired that a power supply capability to a power steering device can be secured while a vehicle is travelling with an engine being stopped, as well as reducing a capacity of an electric storage device.

An object of the present invention is to provide a vehicle controlling system which can secure a power supply capability of an electric storage device to a power steering device while a vehicle is travelling with an engine being stopped and can reduce a capacity of the electric storage device at the same time, in a vehicle including a power steering device and a starting device for starting an engine while the vehicle is travelling with the engine being stopped.

Solution to Problem

A vehicle controlling system according to the present invention includes an engine as a power source of a vehicle; an electric storage device; a generator that generates power by rotating in conjunction with a rotation of the engine; a starting device that starts the engine by consuming power from the electric storage device; and a power steering device that can receive power supplied from the electric storage device and the generator, respectively, and operates by consuming the supplied power. The vehicle controlling system starts the engine by the starting device based on a vehicle speed, and changes a predetermined vehicle speed, which is a vehicle speed when the engine is started, in response to a state of the electric storage device, during an execution of inertial running in which the engine is stopped to allow the vehicle to run with inertia.

In the vehicle controlling system, it is preferable that the predetermined vehicle speed, when a power supply capability of the electric storage device is low, is a vehicle speed higher than the predetermined vehicle speed, when the power supply capability of the electric storage device is high.

In the vehicle controlling system, it is preferable that power consumed by the power steering device is changed in response to a vehicle speed, and the predetermined vehicle speed is (i) a lower limit vehicle speed in a vehicle speed range in which the electric storage device can output power consumed by the starting device when the engine is started and power consumed by the power steering device at the same time, or (ii) a vehicle speed close to the lower limit vehicle speed in the vehicle speed range.

In the vehicle controlling system, it is preferable that the vehicle speed range is a range, in which the electric storage device can output power consumed by the starting device and power consumed by the power steering device at the same time, while keeping an output voltage in a voltage range in which an equipment supplied with power from the electric storage device can operate.

In the vehicle controlling system, it is preferable that the vehicle controlling system operates the engine by prohibiting to perform the inertial running, when travel conditions including a vehicle speed are in a predetermined inertial running-prohibited region. And it is preferable that the inertial running-prohibited region, when the power supply capability of the electric storage device is low, is more increased than the inertial running-prohibited region, when the power supply capability of the electric storage device is high.

In the vehicle controlling system, it is preferable that the lower a power supply capability of the electric storage device is, the more the inertial running-prohibited region increases.

In the vehicle controlling system, it is preferable to further include a regeneration device that converts motion energy of the vehicle to electric energy, wherein when the inertial running is performed, the vehicle controlling system supplies power output by the regeneration device to at least one of the electric storage device, the starting device, and the power steering device, and determines the predetermined vehicle speed based on the power output by the regeneration device.

In the vehicle controlling system, it is preferable the vehicle controlling system controls an output voltage of the regeneration device, when the inertial running is performed, to be higher than an output voltage of the regeneration device when in a travel state other than the inertial running.

Advantageous Effects of Invention

A vehicle controlling system according to the present invention includes an electric storage device, a generator that generates power by rotating in conjunction with a rotation of an engine, a starting device that starts the engine by consuming power from the electric storage device, and a power steering device which can receive power supplied from the electric storage device and the generator, respectively, and operates by consuming the supplied power. In the vehicle controlling system, during an execution of inertial running in which the engine is stopped to allow a vehicle to run with inertia, the starting device starts the engine based on a vehicle speed and changes a predetermined vehicle speed, which is a vehicle speed when the engine is started, in response to a state of the electric storage device. Therefore, according to the vehicle controlling system, an effect can be achieved in that a power supply capability of the electric storage device to the power steering device can be secured while the vehicle is travelling with the engine being stopped and a capacity of the electric storage device can be reduced at the same time.

DESCRIPTION OF EMBODIMENTS

Figure 1:
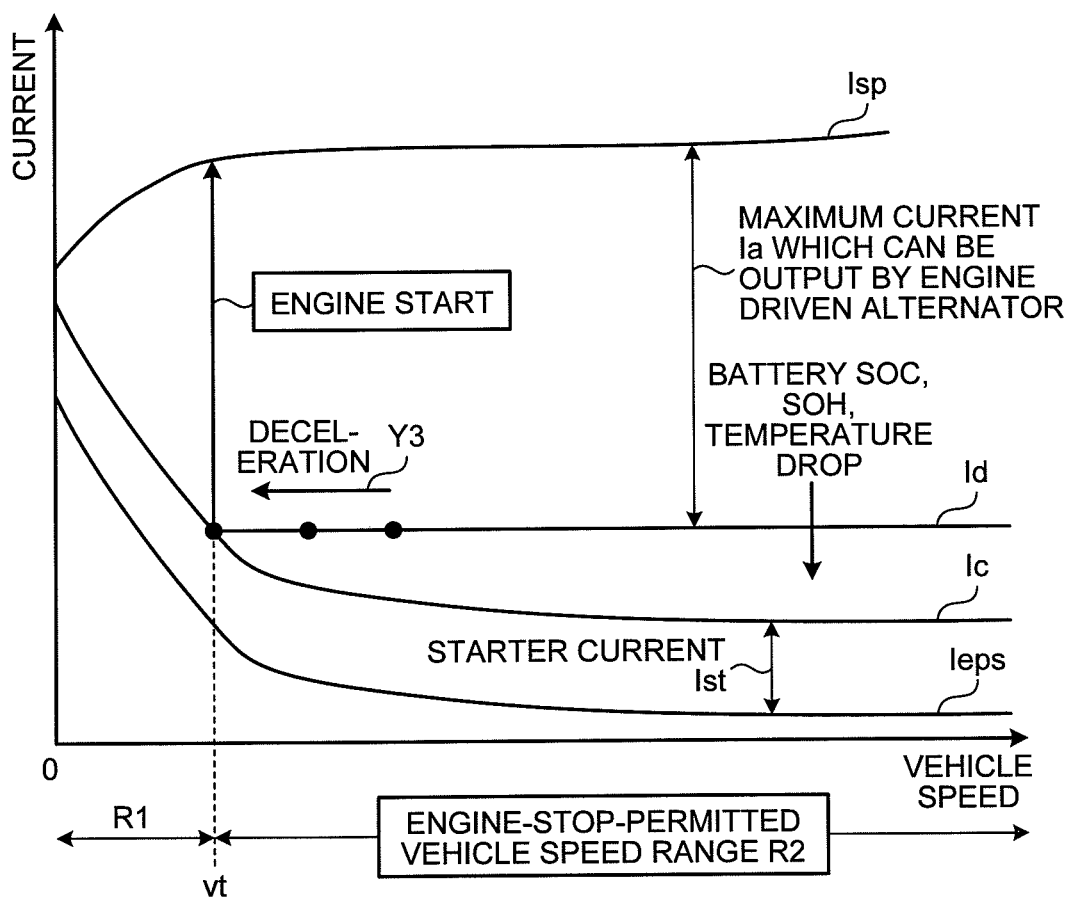
FIG. 1 is a view for explaining control details of a vehicle controlling system according to a first embodiment.

An embodiment of a vehicle controlling system according to the present invention will be explained in detail referring to the drawings. Note that the invention is by no means limited by the embodiment. Further, components in the embodiment include components that can be easily conceived by persons skilled in the art or substantially the same components.

First Embodiment

Figure 2:
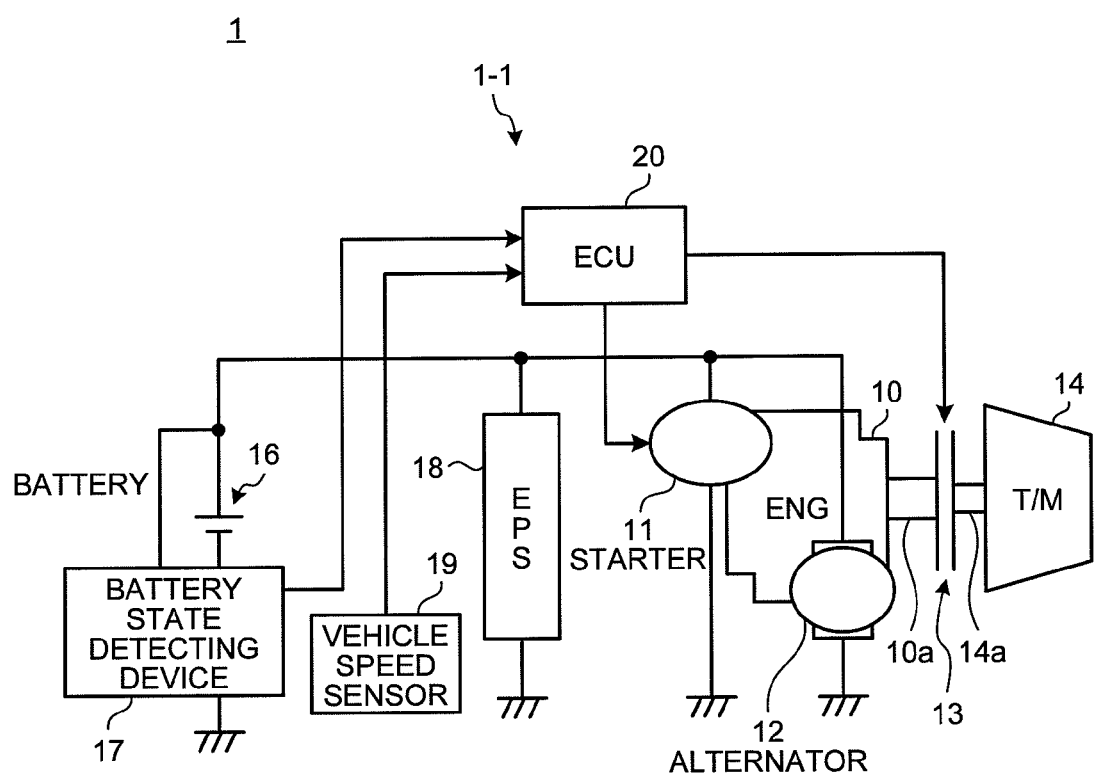
FIG. 2 is a schematic configuration view showing a main portion of a vehicle according to the first embodiment.

A first embodiment will be explained referring to FIGS. 1 to 7. The present embodiment relates to a vehicle controlling system. FIG. 1 is a view for explaining control details of the vehicle controlling system according to the first embodiment, and FIG. 2 is a schematic configuration view showing a main portion of a vehicle according to the first embodiment.

A vehicle controlling system 1-1 of the present embodiment controls a vehicle 1 including a control device for causing the vehicle (see reference numeral 1 of FIG. 2) to travel in a state, in which an engine (see reference numeral 10 of FIG. 2) is stopped. During an execution of an inertial running (free running) in which the engine 10 is stopped and the vehicle 1 is caused to travel by inertia by eliminating an engine resistance loss (or an engine brake loss), the vehicle controlling system 1-1 starts to generate power by an alternator (see reference numeral 12 of FIG. 2) by starting the engine 10 to supply the power to an electric power steering device (EPS, see reference numeral 18 of FIG. 2). As explained below, the vehicle controlling system 1-1 determines timing of starting the engine so that a power supply capability of a battery (see reference numeral 16 of FIG. 2) to the EPS 18 can be secured during inertial running.

When the vehicle 1 is caused to travel in the state that the engine 10 is stopped, power cannot be generated by the alternator 12 while the engine for travelling is stopped. Therefore, it is necessary to start to generate power by the alternator 12 by starting the engine 10, in consideration of the power supply capability of the battery 16 and power consumed by large power loads by the EPS 18 and the like. It is also necessary to take a possibility into consideration that timing of driving a starter to start the engine overlaps timing of operation of the EPS.

When the starter (see reference numeral 11 of FIG. 2) is driven to start the engine 10, a power supply voltage drops temporarily (in general, one second or less). When it is intended to cause a free running system and an EPS system to coexist using one unit of the battery 16, it is necessary to permit the engine to stop only under conditions in which a stable operation of the EPS 18 can be guaranteed (to prohibit to stop the engine under conditions in which the stable operation cannot be guaranteed). To secure the power supply capability to the EPS 18, it is effective to reduce a region for permitting to stop the engine, in other words, to start the engine 10 under conditions in which a current of the EPS 18 is small (a vehicle speed is high) and when the battery 16 is sufficiently charged. However, to improve fuel consumption, it is desired to permit the engine to stop as long as possible (that is, automatically starting the engine is not desirable). Accordingly, it is desired that the engine stop can be permitted based on an appropriate guarantee determination method. Further, since a performance of the battery 16 is changed depending on a state of the battery 16 (charge state, temperature, degree of deterioration, and the like) and influences on a guarantee of the stable operation of the EPS, a countermeasure for the change of the battery 16 is necessary.

In the present embodiment, the vehicle controlling system 1-1 starts the engine 10 based on a vehicle speed during an execution of inertial running. In the EPS 18, the lower a vehicle speed is, the more assist torque increases, thereby increasing power consumption. Accordingly, a maximum current consumed by the EPS 18 can be estimated based on the vehicle speed. The vehicle controlling system 1-1 permits the engine to stop in a range of the vehicle speed, in which the battery 16 can output the maximum current consumed by the EPS 18 and a current consumed by the starter 11 when the engine starts at the same time. Further, when the vehicle speed is lowered, the power supply capability is secured by starting the engine 10 at the time the vehicle speed is still in a range, in which an appropriate current can be supplied to the EPS 18 and to the starter 11 at the same time.

A vehicle speed (predetermined vehicle speed) when the engine 10 is started is a lower limit vehicle speed in a range, in which the battery 16 can output the power consumed by the starter 11 and the power consumed by the EPS 18 at the time when the engine 10 starts. In the present embodiment, the predetermined vehicle speed is determined based on a maximum current which can be discharged by the battery 16. More specifically, the predetermined vehicle speed is set to a lower limit in a range of the vehicle speed, in which the maximum current that can be output by the battery 16 can satisfy a maximum current that flows to the EPS 18 and a starter current at the same time. As a result, according to the vehicle controlling system 1-1 of the present embodiment, the power supply capability of the battery 16 to the EPS 18 during inertial running can be secured, a capacity of the battery 16 can be reduced, and the fuel consumption can be improved. In particular, the vehicle controlling system 1-1 of the present embodiment changes the predetermined vehicle speed in response to a state of the battery 16. Accordingly, the power supply capability to the EPS 18 can be secured and the fuel consumption can be improved at the same time to a maximum extent.

The present embodiment uses a vehicle including the following components (1) to (8) as a premise.
(1) Power train system capable of stopping an engine while a vehicle travels and performing inertial running, or a mild HV system for starting an engine by a starter
(2) Alternator (engine driven generator)
(3) Starter motor
(4) EPS (electrically driven power steering device)
(5) Battery
(6) Battery state detector (parts (system) for calculating a battery SOC (charge amount) and a battery SOH (degree of deterioration) from a current, a voltage, a temperature, and the like of a battery. In addition, a type of such device for calculating an internal resistance of a battery may be used.)
(7) Vehicle speed sensor
(8) ECU In FIG. 2, reference numeral 1 denotes the vehicle. The vehicle 1 includes the engine 10 as a power source, the alternator 12, a clutch 13, a T/M 14, the battery 16, the EPS 18, and an ECU 20.

The engine 10 is a known heat engine, for example, an internal combustion engine. The engine 10 has the starter 11. The starter 11 is a starting device for starting the engine 10 by consuming power from the battery 16. The starter 11 is, for example, a known starter motor which can rotate the engine 10 by being rotated by the power from the battery 16 to start the engine 10.

The battery 16 is an electric storage device capable of charging and discharging electricity. A lead storage battery, for example, can be used as the battery 16. The battery 16 is connected to the starter 11 and the EPS 18 and can supply power to the starter 11 and the EPS 18. The battery 16 is disposed with a battery state detecting device 17 for detecting a state of the battery 16. The battery state detecting device 17 can detect a charge state SOC of the battery 16, a temperature of the battery 16, a degree of deterioration SOH of the battery 16, and the like. The charge state SOC can be shown by, for example, a ratio (%) of an actually charged amount to a charge capacity of the battery 16. The degree of deterioration SOH is a value showing a degree of deterioration of the battery 16. A larger degree of deterioration of the battery 16 makes the degree of deterioration SOH a smaller value. The charge state SOC and the degree of deterioration SOH are detected by a known method.

The engine 10 is disposed with the alternator 12.

The alternator 12 is a generator which generates power by rotating in conjunction with a rotation of a rotating shaft 10a of the engine 10. A power generation amount of the alternator 12 is adjustable. The power generated by the alternator 12 is supplied to power loads such as the starter 11, the EPS 18, and the like. The battery 16 can be charged by the power generated by the alternator 12. When the engine 10 is stopped (the rotating shaft 10a is not rotating), the alternator 12 is also stopped, and therefore, power is not generated by the alternator 12.

The T/M 14 is a transmission of the vehicle 1. The T/M 14 changes a rotation speed transmitted from the engine 10 and transmits the changed rotation to driven wheels (not shown). The rotating shaft 10a of the engine 10 is coupled with an input shaft 14a of the T/M 14 via the clutch 13. When the clutch 13 is engaged, the rotating shaft 10a of the engine 10 and the input shaft 14a of the T/M 14 can transmit power therebetween. In the case, the power output by the engine 10 is transmitted to the driven wheels via the T/M 14. In contrast, when the clutch 13 is disengaged, the rotating shaft 10a of the engine 10 is disconnected from the input shaft 14a of the T/M 14, and therefore, the rotating shaft 10a of the engine 10 and the input shaft 14a of the T/M 14 cannot transmit power therebetween. That is, in the state in which the clutch 13 is disengaged, the vehicle 1 can travel in a state that the engine 10 is stopped. Since the T/M 14 is rotated in conjunction with a rotation of the driven wheels, the T/M 14 rotates at all times when the vehicle 1 is traveling.

The EPS 18 is an electric power steering device. The EPS 18 is connected to the alternator 12 and the battery 16. The EPS 18 can receive a supply of power from the alternator 12 and the battery 16, respectively. The EPS 18 also operates by consuming the power supplied thereto, and applies assist torque for assisting a steering operation to a steering device (not shown).

When, for example, the alternator 12 is not generating power, the EPS 18 operates by consuming the power from the battery 16. Alternatively, when the alternator 12 is generating power, the EPS 18 operates by consuming the power of any one of the battery 16 and the alternator 12.

The EPS 18 detects steering torque, when a driver operates the steering device and applies assist torque, in response to detected steering torque to the steering device. The EPS 18 has a motor (not shown) and can apply arbitrary assist torque to the steering device by the motor.

The vehicle 1 is disposed with the electronic control unit (ECU) 20 for controlling respective portions of the vehicle 1 including the engine 10. The ECU 20 is electrically connected to the engine 10 and performs various controls to the engine 10. For example, the ECU 20 controls a fuel injection amount, fuel injection timing, fuel ignition timing, and the like in the engine 10. Further, the ECU 20 performs a start control of the engine 10. When the engine 10 is started, the ECU 20 performs cranking of the engine 10 by operating the starter 11, and when an engine rotational number is increased by the cranking, the ECU 20 injects a fuel into the engine 10 and ignites the fuel. The ECU 20 integrally controls the vehicle 1 including the control of the engine 10. The vehicle 1 is disposed with a vehicle speed sensor 19 for detecting a vehicle speed. The battery state detecting device 17 and the vehicle speed sensor 19 are connected to the ECU 20, and signals showing results of detection by the battery state detecting device 17 and the vehicle speed sensor 19 are output to the ECU 20. The vehicle controlling system 1-1 of the present embodiment includes the engine 10, the starter 11, the battery 16, the alternator 12, the EPS 18, and the ECU 20.

The ECU 20 is connected to the alternator 12 and controls the alternator 12. When the clutch 13 is engaged, that is, when the rotating shaft 10a of the engine 10 rotates, the ECU 20 causes the alternator 12 to generate power. The ECU 20 determines the power generation amount of the alternator 12 based on, for example, the power required by a power load.

The ECU 20 can perform inertial running for causing the vehicle 1 to travel by inertia by stopping the engine 10. The inertial running is performed when, for example, an accelerator is turned off while the vehicle 1 travels. When the ECU 20 determines that the accelerator is turned off based on a result of detection by a sensor for detecting an amount of operation to an accelerator pedal (not shown), the ECU 20 performs the inertial running. During the inertial running, the ECU 20 causes the vehicle 1 to travel by disengaging the clutch 13 and stopping a rotation of the engine 10.

Figure 3:
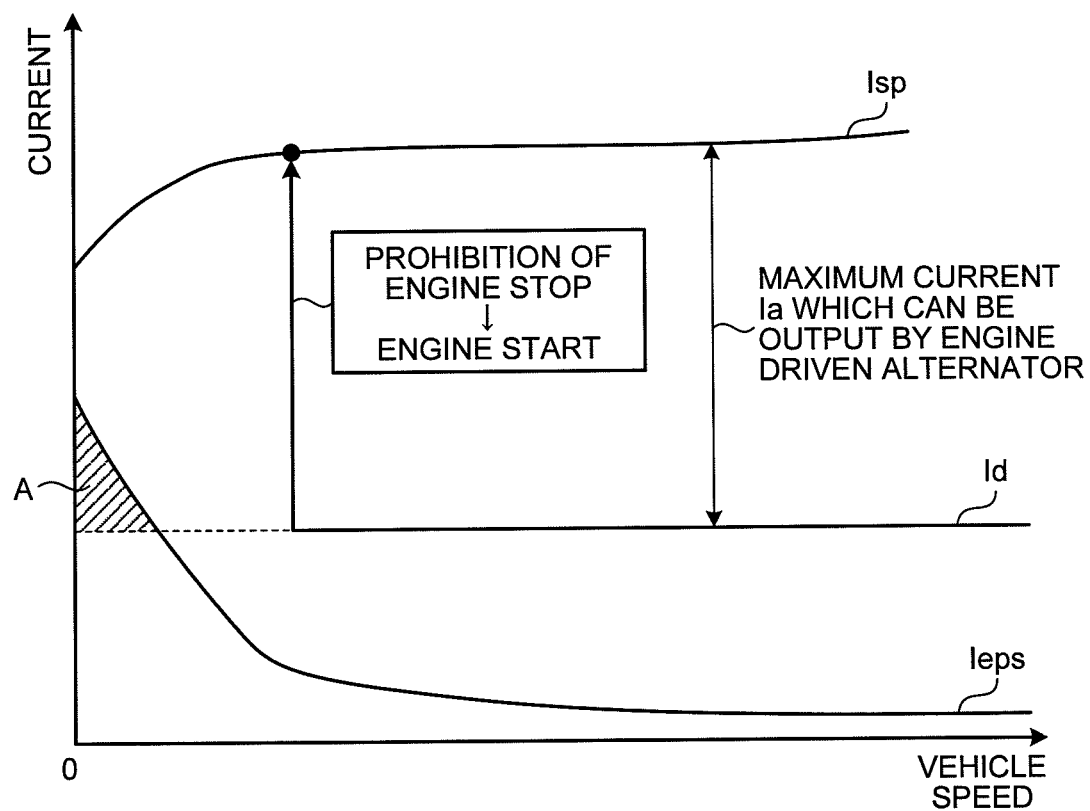
FIG. 3 is a view showing an example of a start determination method of an engine.

The EPS 18 determines a target value (target assist torque) of the assist torque based on the steering torque and the vehicle speed. Since the assist torque is changed based on the vehicle speed, it is necessary to restart the engine 10 during inertial running based on the vehicle speed, as explained below referring to FIG. 3. FIG. 3 is a view showing an example of a start determination method of the engine 10.

In FIG. 3, a horizontal axis shows a vehicle speed and a vertical axis shows a current value. Symbol Ieps shows a maximum current which flows in (is consumed by) the motor of the EPS 18 (hereinafter, simply described as "EPS maximum current"). The EPS maximum current Ieps corresponds to a maximum value of assist torque generated at respective vehicle speeds. As shown in FIG. 3, a lower vehicle speed makes the EPS maximum current Ieps a larger current value. This corresponds to that a smaller vehicle speed more increases a resistance of the steering device and the EPS 18 generates a larger amount of assist torque.

Further, symbol Id shows a maximum current which can be discharged by the battery 16 (hereinafter, simply described as "battery maximum current"). The battery maximum current Id is a maximum current value which the battery 16 can discharge while keeping an output voltage at least equal to or more than a predetermined voltage. The predetermined voltage is a value in a voltage range, in which equipment supplied with the power from the battery 16 can normally operate. More specifically, when a voltage equal to or more than the predetermined voltage is kept, respective equipment can be normally operated by the power from the battery 16. The battery maximum current Id has an approximately constant value regardless of the vehicle speed.

Symbol Ia shows a maximum current which can be generated and output by the alternator 12 (hereinafter, simply described as "alternator maximum current"). The alternator maximum current Ia is changed depending on the vehicle speed, and, in a region on a low speed side, a smaller vehicle speed more reduces its current value. Symbol Isp shows a maximum supply current. The maximum supply current Isp is a maximum value of currents which can be output by the battery 16 and the alternator 12, that is, a sum of the battery maximum current Id and the alternator maximum current Ia.

Since the alternator 12 is stopped during inertial running, a maximum current which can be supplied to the EPS 18 is the battery maximum current Id. The lower a vehicle speed is, the more a value of the EPS maximum current Ieps increases. In a low vehicle speed range, the battery maximum current Id is lower than the EPS maximum current Ieps, as shown by symbol A. Therefore, when the vehicle travels at a low vehicle speed, it is necessary to operate the engine 10 and to supply the power generated by the alternator 12 to the EPS 18.

Figure 4:
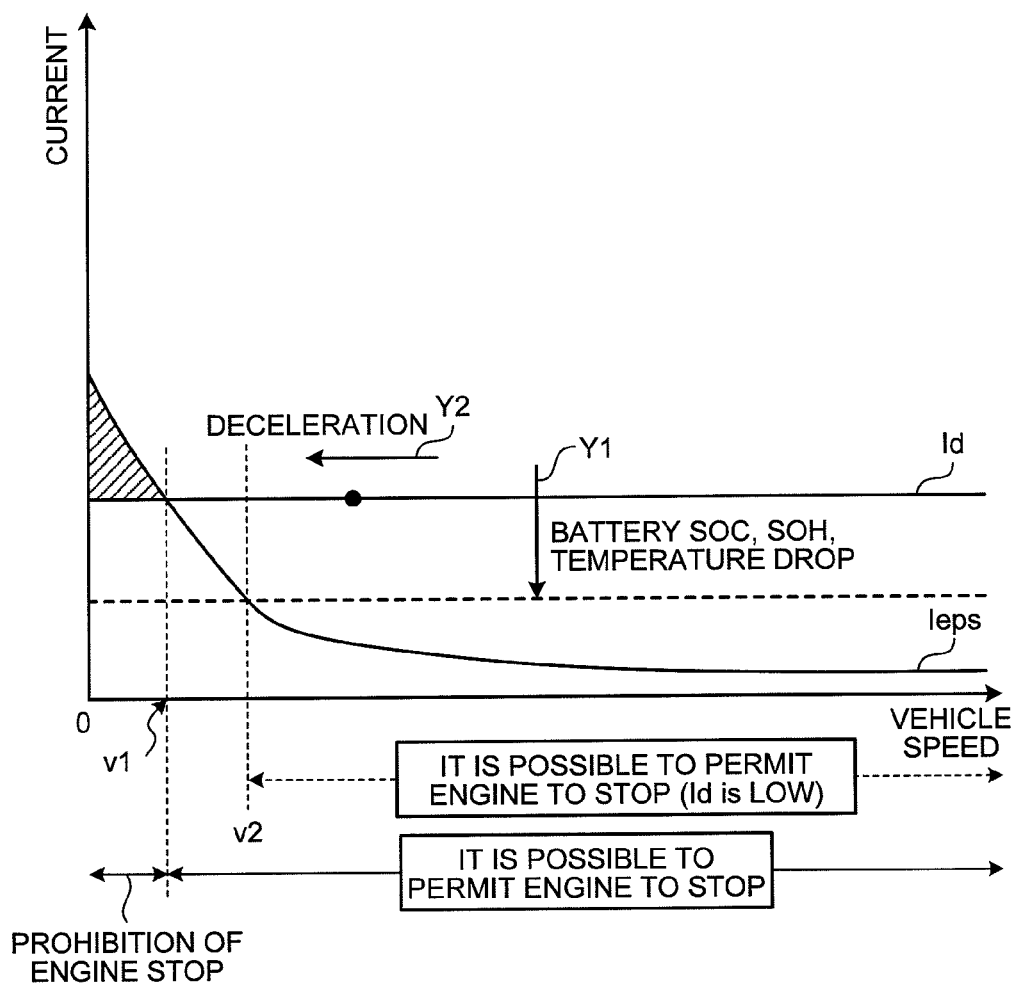
FIG. 4 is a view for explaining a power supply capability of a battery.

Further, as explained referring to FIG. 4, a vehicle speed range varies, in which stopping the engine 10 is prohibited. FIG. 4 is a view for explaining the power supply capability of the battery 16. In FIG. 4, symbol v1 shows a vehicle speed at which the EPS maximum current Ieps intersects the battery maximum current Id when the power supply capability of the battery 16 is high. On a side where the vehicle speed is lower than the vehicle speed v1, the battery maximum current Id is lower than the EPS maximum current Ieps, and therefore, it is necessary to prohibit the engine 10 from being stopped. In contrast, on a side where the vehicle speed is higher than the vehicle speed v1, the battery maximum current Id is higher than the EPS maximum current Ieps, and therefore, it can be permitted to stop the engine 10.

When the power supply capability of the battery 16 is low as in a case that the charge state SOC, the degree of deterioration SOH, and the temperature of the battery 16 are lowered, and the like, the battery maximum current Id is lowered as shown by an arrow Y1. Symbol v2 shows a vehicle speed at which the EPS maximum current Ieps intersects the battery maximum current Id when the battery maximum current Id is lowered. As shown in FIG. 4, when the power supply capability of the battery 16 is lowered, the vehicle speed range is increased in which it is prohibited to stop the engine 10, and the vehicle speed range is reduced in which it is permitted to stop the engine 10.

Accordingly, when the vehicle speed is reduced during inertial running as shown in an arrow Y2, vehicle speed at which the engine 10 is to be restarted varies depending on a state of the battery 16. When the power supply capability of the battery 16 is low, it is necessary to restart the engine 10 at a vehicle speed which is higher than the speed when the power supply capability is high.

Further, when the starter 11 is driven at the time when the engine 10 is started, it is necessary to take into consideration that a voltage drops in the battery 16. It is preferable that timing of restarting the engine 10 can be determined even if the voltage drops in the battery 16, so that the power supply capability to the EPS 18 can be secured.

In the vehicle controlling system 1-1 of the present embodiment, the vehicle speed (predetermined vehicle speed) when the engine 10 is started is determined based on the starter current Ist in addition to the EPS maximum current Ieps, as explained referring to FIG. 1. With the operation, the power supply capability to the EPS 18 during inertial running can be secured as well as a capacity necessary to the battery 16 can be reduced.

In FIG. 1, symbol Ist shows the starter current. The starter current Ist is a maximum value of a current which flows to the starter 11 (i.e. which is discharged from the battery 16) when the engine 10 is started.

Further, symbol Ic shows a total of maximum currents when the starter 11 and the EPS 18 individually operate, respectively, that is, a sum of the EPS maximum current Ieps and the starter current Ist. In the following explanation, the sum Ic of the EPS maximum current Ieps and the starter current Ist is described as "maximum consumption current Ic".

In the present embodiment, the engine 10 is started at a predetermined vehicle speed vt at which the maximum consumption current Ic intersects the battery maximum current Id. More specifically, a region of a vehicle speed larger than the predetermined vehicle speed vt is set as an engine-stop-permitted vehicle speed range R2 in which it is permitted to stop the engine 10, whereas a region of a vehicle speed equal to or smaller than the predetermined vehicle speed vt is set as an engine-stop-prohibited vehicle speed range R1 in which it is prohibited to stop the engine 10. The engine-stop-permitted vehicle speed range R2 corresponds to a range of a vehicle speed in which the battery 16 can output the power consumed by the starter 11 and the power consumed by the EPS 18 at the same time when the engine 10 is started. The engine-stop-permitted vehicle speed range R2 is a range of a vehicle speed in which the battery 16 can output the maximum consumption current Ic while keeping an output voltage in a voltage range in which the equipment supplied with the power from the battery 16 can operate. The predetermined vehicle speed vt corresponds to a lower limit vehicle speed of the engine-stop-permitted vehicle speed range R2. In other words, the engine-stop-prohibited vehicle speed range R1 and the engine-stop-permitted vehicle speed range R2 are determined by the predetermined vehicle speed vt, respectively.

Even in a speed reduction state, when the engine 10 is started in the engine-stop-permitted vehicle speed range R2, the EPS 18 and the starter 11 can be operated at the same time even if timing of starting the engine agrees with timing of operating the EPS 18. When the accelerator is turned off while the vehicle is traveling, the ECU 20 determines whether or not inertial running is possible based on a vehicle speed at the time. When the vehicle speed at the time is in the engine-stop-prohibited vehicle speed range R1 which is equal to or lower than the predetermined vehicle speed vt, the ECU 20 prohibits to perform the inertial running and causes the vehicle 1 to travel in a state that the engine 10 is operated.

In contrast, when the vehicle speed at the time is higher than the predetermined vehicle speed vt, the ECU 20 can permit the inertial running, disengage the clutch 13, and cause the vehicle 1 to travel while the engine 10 is stopped. When a speed reduction is performed and a vehicle speed is reduced to the predetermined vehicle speed vt at the time the inertial running is performed in the engine-stop-permitted vehicle speed range R2, as shown in an arrow Y3, the ECU 20 starts the engine 10. Since the engine 10 is started and the alternator 12 generates power, a current up to the maximum supply current Isp can be supplied to the starter 11 and the EPS 18. With the operation, the power supplied to the EPS 18 can be secured in the engine-stop-prohibited vehicle speed range R1 equal to or lower than the predetermined vehicle speed vt. As described above, when the inertial running is performed, the vehicle controlling system 1-1 starts the engine 10 by the starter 11 based on a vehicle speed.

Further, the ECU 20 determines whether or not the engine 10 can be stopped based on the battery maximum current Id in response to a state of the battery 16. An engine stop prohibition condition based on which the ECU 20 prohibits the engine 10 from being stopped is determined as shown by the following expression (1):

$$Id(Vbat, Rbat) \leq Ieps(v) + Ist \qquad (1)$$

wherein,
Vbat: battery terminal voltage;
Rbat: battery internal resistance; and
v: vehicle speed (vehicle speed at the time).

The battery internal resistance Rbat can be calculated based on a map previously stored using the charge state SOC, the degree of deterioration SOH, and the battery temperature Tbat as parameters. Otherwise, it is sufficient to use a battery state detecting device which can detect or estimate the battery internal resistance Rbat as the battery state detecting device 17. In this case, the ECU 20 can obtain the battery internal resistance Rbat from a result of detection of the battery state detecting device 17. Note that it is sufficient to determine the battery internal resistance Rbat based on at least one of the charge state SOC, the degree of deterioration SOH, and the battery temperature Tbat. That is, it is sufficient that the state of the battery 16, which changes the predetermined vehicle speed vt, is at least one of the charge state SOC, the degree of deterioration SOH, and the battery temperature Tbat.

The ECU 20 determines the battery maximum current Id from the battery terminal voltage Vbat and the battery internal resistance Rbat based on a previously stored computation expression (program). The battery maximum current Id is calculated by, for example, the following expression (2):

$$Id = (Vbat - Vmin)/Rbat \qquad (2)$$

wherein, Vmin is a lowest voltage at which the EPS can be operated and shows a lowest voltage at which a previously determined EPS 18 can normally operate.

Further, the ECU 20 determines the EPS maximum current Ieps based on a computation expression previously stored in the ECU 20 based on a vehicle speed v. The starter current Ist is a value previously stored in the ECU 20. When the expression (1) is established, the ECU 20 prohibits the engine 10 from being stopped. For example, even if the driver intends to stop the engine 10 while the vehicle is traveling, the engine 10 is prohibited from being stopped. In contrast, when the expression (1) is not established, the ECU 20 can permit the engine 10 to stop. As described above, in the present embodiment, whether or not the engine 10 can be stopped is determined based on a result of comparison between the battery maximum current Id, which changes depending on the state of the battery 16, and the maximum consumption current Ic (EPS maximum current Ieps+starter current Ist). That is, the vehicle controlling system 1-1 changes the predetermined vehicle speed in response to the state of the battery 16. Note that the battery maximum current Id and the EPS maximum current Ieps may be determined based on a previously stored map in place of the computation expression.

As explained referring to FIG. 4, when the power supply capability of the battery 16 is lowered such as when the charge state SOC is lowered and the like, the battery maximum current Id is lowered more than when the power supply capability is high (refer to the arrow Y1). Accordingly, since the predetermined vehicle speed vt is higher when the power supply capability of the battery 16 is low compared to the predetermined vehicle speed vt when the power supply capability is high, the engine-stop-prohibited vehicle speed range R1 is increased. Further, the lower a lower power supply capability of the battery 16 is, the more the engine-stop-prohibited vehicle speed range R1 increases.

As described above, according to the vehicle controlling system 1-1 of the present embodiment, the power supply capability to the EPS 18 during inertial running can be secured and the capacity of the battery 16 can be reduced at the same time, as well as the fuel consumption can be improved. In particular, since the predetermined vehicle speed vt changes based on the state of the battery 16, the power supply capability to the EPS 18 can be secured and the fuel consumption can be improved at the same time to a maximum extent.

Note that a current value which determines the maximum consumption current Ic is not limited to the EPS maximum current Ieps and the starter current Ist. When power loads other than the EPS 18 and the starter 11 are operated by the power from the battery 16, a current value supplied to the power loads may be added to the maximum consumption current Ic.

In the present embodiment, although the predetermined vehicle speed vt is set to the lower limit vehicle speed of the engine-stop-permitted vehicle speed range R2, the predetermined vehicle speed vt is not limited to the lower limit vehicle speed. The predetermined vehicle speed vt may be a vehicle speed close to the lower limit vehicle speed in the engine-stop-permitted vehicle speed range R2. When, for example, a vehicle speed in deceleration greatly changes, a vehicle speed higher than the lower limit vehicle speed of the engine-stop-permitted vehicle speed range R2 may be set as the predetermined vehicle speed vt, and the engine 10 may be started when the vehicle speed is lowered to the predetermined vehicle speed vt.

Note that, although whether or not the inertial running can be permitted is determined based on a vehicle speed in the present embodiment, travel conditions for determining whether or not the inertial running can be permitted is not limited to the vehicle speed. In the present embodiment, the engine-stop-prohibited vehicle speed range R1 corresponds to a inertial running-prohibited region in which inertial running is prohibited, and the engine-stop-permitted vehicle speed range R2 corresponds to a inertial running-permitted region in which inertial running is permitted. However, the inertial running-prohibited region and the inertial running-permitted region may be regions having travel conditions including a travel condition other than the vehicle speed. More specifically, the inertial running may be prohibited or permitted based on other travel conditions in addition to the vehicle speed. In such an engine-stop-prohibited vehicle speed range including the travel conditions other than the vehicle speed, a inertial running-prohibited region when the power supply capability of the electric storage device is low may be set larger than a inertial running-prohibited region when the power supply capability of the electric storage device is high. In the inertial running-prohibited region, the travel conditions other than the vehicle speed are, for example, an engine water temperature and a temperature set to an air conditioner.

Modification of First Embodiment

Figure 5:
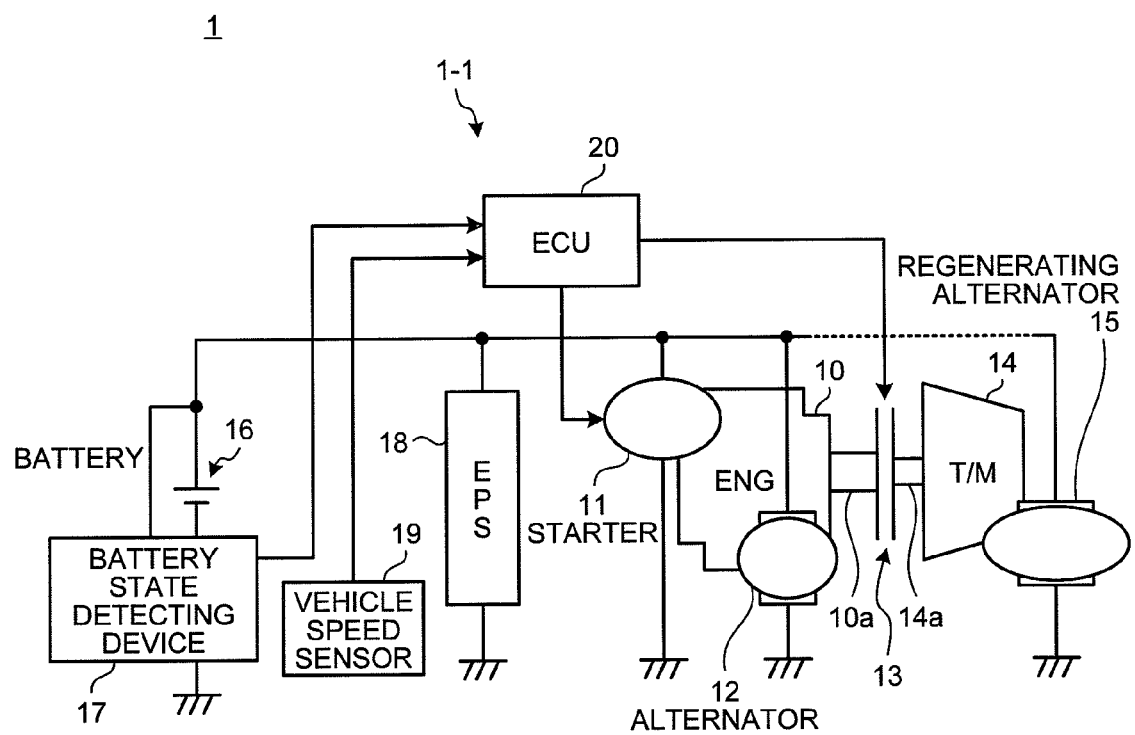
FIG. 5 is a schematic configuration view showing a main portion of a vehicle according to a modification of the first embodiment.

A modification of the first embodiment will be explained. FIG. 5 is a schematic view showing a main portion of a vehicle according to the modification. The vehicle 1 according to the modification is different from the vehicle 1 of the first embodiment in that the vehicle 1 according to the modification includes a regenerating alternator 15.

As shown in FIG. 5, the regenerating alternator 15 is disposed on an output shaft side of a T/M 14. The regenerating alternator 15 rotates in conjunction with a rotation of the output shaft (not shown) of the T/M 14 to thereby generate power. The regenerating alternator 15 functions as a regeneration device for converting motion energy of the vehicle 1 to electric energy. A power generation amount of the regenerating alternator 15 is adjustable. The regenerating alternator 15 is connected to a starter 11, a battery 16, and an EPS 18 and can supply generated power to the starter 11, the battery 16 and the EPS 18. When the regenerating alternator 15 is generating power, the EPS 18 may operate by consuming the power from the regenerating alternator 15 in addition to the power from the battery 16 and the alternator 12, or may operate by consuming only the power from the regenerating alternator 15. When a clutch 13 is disengaged, that is, when an engine 10 and an alternator 12 are disconnected from drive wheels, an ECU 20 can cause the regenerating alternator 15 to generate power. Whether or not the regenerating alternator 15 is caused to generate power may be determined based on regeneration efficiency.

Figure 6:
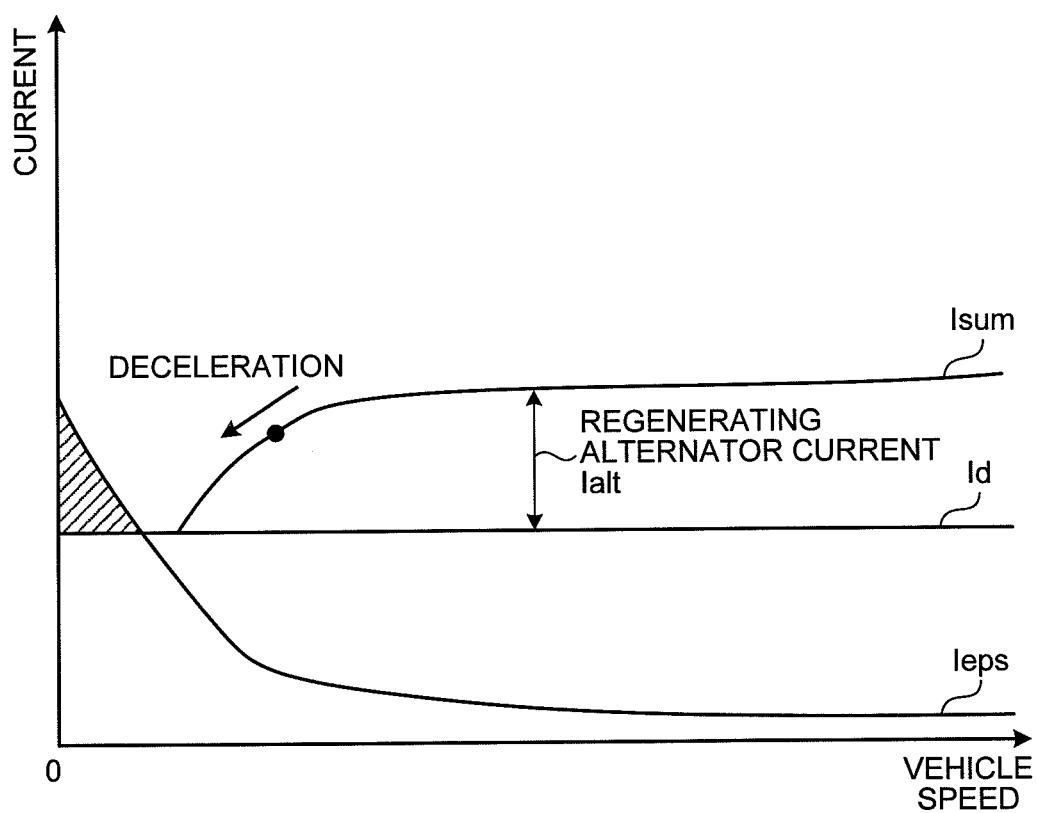
FIG. 6 is a view for explaining a power supply capability when a regenerating alternator generates power.

When the regenerating alternator 15 is generating power during inertial running, the ECU 20 determines whether or not it is possible to permit the engine to stop, as explained below referring to FIGS. 6 and 7. FIG. 6 is a view for explaining a power supply capability of the regenerating alternator 15 when the regenerating alternator 15 is generating power.

In FIG. 6, symbol Ialt shows a current output by the regenerating alternator 15 (hereinafter, simply described as "regenerating alternator current"). Symbol Isum is a sum of the regenerating alternator current Ialt and a battery maximum current Id and shows a current value which can be output by the battery 16 and the regenerating alternator 15 during inertial running (hereinafter, described as "regeneration-time-suppliable current"). When the regenerating alternator 15 is caused to generate power during inertial running, the starter 11 and the EPS 18 can be received a supply of power in a range of the regeneration-time-suppliable current Isum. An output of the regenerating alternator 15 is changed depending on a vehicle speed, and an output of the regenerating alternator 15 is reduced at a low vehicle speed. Therefore, even when the regenerating alternator 15 is generating power, the regeneration-time-suppliable current Isum may be smaller than an EPS maximum current Ieps in a low vehicle speed region.

Figure 7:
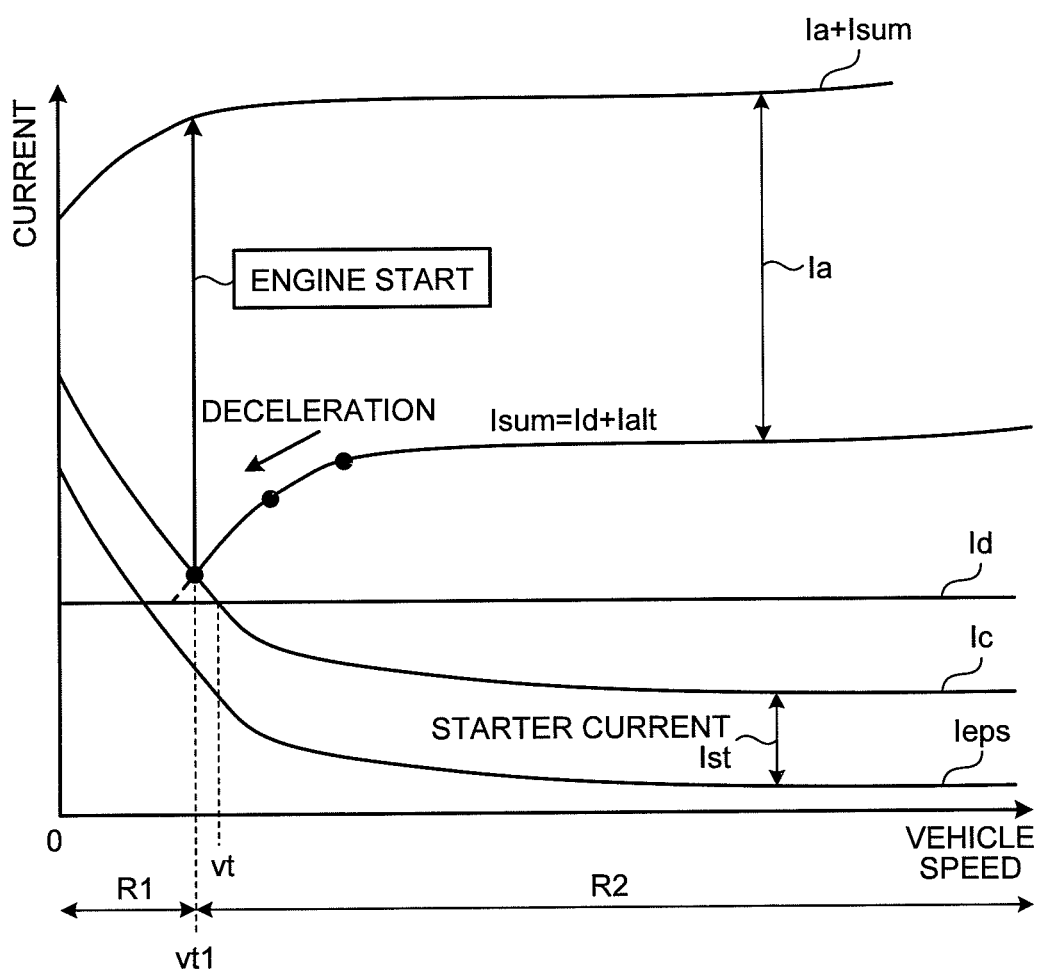
FIG. 7 is a view for explaining control details of the vehicle controlling system when the regenerating alternator generates power.

FIG. 7 is a view for explaining control details of a vehicle controlling system 1-1 when the regenerating alternator 15 is generating power. While the vehicle is inertial running, the power output by the regenerating alternator 15 can be supplied to the battery 16, the starter 11, and the EPS 18. Symbol vt1 shows a predetermined vehicle speed when the regenerating alternator 15 is generating power. The predetermined vehicle speed vt1 is a vehicle speed at which the regeneration-time-suppliable current Isum intersects a maximum consumption current Ic. As described above, the predetermined vehicle speed vt1 when the regenerating alternator 15 generates power is lower than the predetermined vehicle speed vt when the regenerating alternator 15 is not generating power. Accordingly, when the regenerating alternator 15 is generating power, it is possible to stop the engine 10 in a larger vehicle speed range than when the regenerating alternator 15 is not generating power. That is, when the inertial running is performed, fuel consumption can be improved by reducing an engine-stop-prohibited vehicle speed range R1 by causing the regenerating alternator 15 to generate power.

The predetermined vehicle speed vt1 when the regenerating alternator 15 is generating power changes depending on the power output by the regenerating alternator 15. That is, the vehicle controlling system 1-1 determines the predetermined vehicle speed based on the power output by the regenerating alternator 15.

An engine stop prohibition condition when the regenerating alternator 15 is generating power is determined as shown by the following expression (3).

$$Id(Vbat, Rbat) + Ialt(v) \leq Ieps(v) + Ist \quad (3)$$

The ECU 20 determines the battery maximum current Id, the regenerating alternator current Ialt, and the EPS maximum current Ieps based on a previously stored computation expression. For example, the battery maximum current Id can be calculated by the above expression (2). When the expression (3) is established, the ECU 20 prohibits the engine 10 from being stopped. In contrast, when the expression (3) is not established, the ECU 20 can permit the engine 10 to stop. Note that the battery maximum current Id, the regenerating alternator current Ialt, and the EPS maximum current Ieps may be determined based on a previously stored map in place of the computation expression.

Note that a generator, which generates regenerative power during inertial running, is not limited to the regenerating alternator 15. For example, the modification can be applied to a hybrid vehicle provided with a generator capable of generating regenerative power while an engine is stopped.

Second Embodiment

Figure 8:
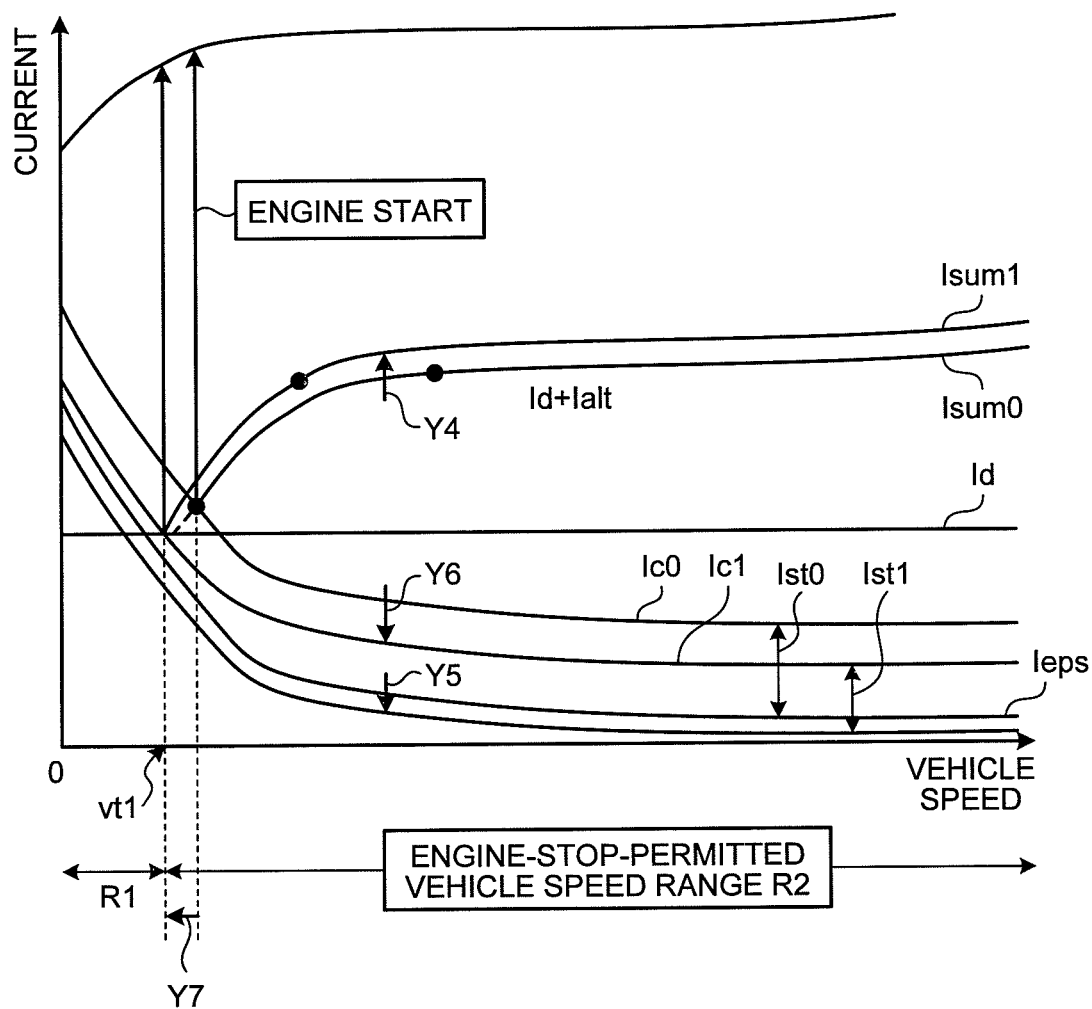
FIG. 8 is a view for explaining control details according to a second embodiment.

A second embodiment will be explained referring to FIG. 8. In the second embodiment, the components which have the same functions as those of the above embodiment are shown by the same symbols and the same explanation for those components will not be repeated. FIG. 8 is a view for explaining control details of the second embodiment.

In the present embodiment, an engine-stop-permitted vehicle speed range R2 is increased by increasing a voltage of power generated by a regenerating alternator 15 during inertial running. As a result, fuel consumption can be improved. In FIG. 8, symbol Isum1 shows a regeneration-time-suppliable current of the present embodiment during inertial running. In the present embodiment, an output voltage of the regenerating alternator 15 is made higher during inertial running than in a travel state other than the inertial running. In the following explanation, a power generation state, in which the output voltage of the regenerating alternator 15 is made higher during inertial running than the travel state other than the inertial running, is described as a state in a "high voltage power generation time".

Symbol Isum0 shows a regeneration-time-suppliable current when the regenerating alternator 15 is caused to generate power in an output voltage in the travel state other than the inertial running. In the following explanation, a power generation state, in which an output voltage of the regenerating alternator 15 during inertial running is made to the same output voltage as that in the travel state other than the inertial running, is described as a state in a "low voltage power generation time". Note that the travel state other than the inertial running is a travel state in which, for example, a vehicle travels by the power of an engine 10 by operating the engine 10.

As described above, an ECU 20 makes a power generation voltage of the regenerating alternator 15 higher during inertial running than in the travel state other than the inertial running. As a result, since a regenerating alternator current Ialt is more increased during inertial running than that in the travel state other than the inertial running, the regeneration-time-suppliable current Isum can be made to a large value, as shown in an arrow Y4.

Further, since the power generation voltage of the regenerating alternator 15 is made to a high voltage and a voltage supplied to an EPS 18 is made high, an EPS maximum current Ieps is lowered as shown in an arrow Y5. Likewise, since the power generation voltage of the regenerating alternator 15 is made to the high voltage, a starter current Ist is also lowered. Symbol Ist1 shows a starter current in the high voltage power generation time, and symbol Ist0 shows a starter current in the low voltage power generation time. The starter current Ist1 in the high voltage power generation time is lower than the starter current Ist0 in the low voltage power generation time. As a result, a maximum consumption current Ic1 in the high voltage power generation time is made lower than a maximum consumption current Ic0 in the low voltage power generation time, as shown in an arrow Y6.

As described above, when the output voltage of the regenerating alternator 15 is made to the high voltage, the regeneration-time-suppliable current Isum is increased as well as a maximum consumption current Ic is lowered, and therefore, a predetermined vehicle speed vt1 is made to a low speed as shown in an arrow Y7. Accordingly, the engine-stop-permitted vehicle speed range R2 is increased and an engine-stop-prohibited vehicle speed range R1 is reduced. That is, according to the present embodiment, since a vehicle speed range in which the inertial running can be performed is increased, the fuel consumption can be improved.

Note that, when the regenerating alternator 15 is caused to generate power during inertial running, the power generation voltage of the regenerating alternator 15 may be made high only in a certain vehicle speed. For example, only when a current vehicle speed is close to the predetermined vehicle speed vt1 during inertial running, the power generation voltage of the regenerating alternator 15 may be made higher than that in the travel state other than the inertial running. The engine-stop-permitted vehicle speed range R2 can be also increased in this manner.

Note that the contents of the respective embodiments described above may be performed in an appropriate combination.

INDUSTRIAL APPLICABILITY

As described above, the vehicle controlling system according to the present invention is useful to a vehicle which can perform inertial running in which the vehicle is caused to travel while an engine is stopped and, in particular, suitable to secure a power supply capability of an electric storage device to a power steering device during inertial running and to reduce a capacity of the electric storage device at the same time.

The invention claimed is:
1. A vehicle controlling system comprising:
an engine as a power source of a vehicle;
an electric storage device;
a generator that generates power by rotating in conjunction with a rotation of the engine;
a starting device that starts the engine by consuming power from the electric storage device; and
a power steering device that can receive power supplied from the electric storage device and the generator, respectively, and operates by consuming the supplied power, wherein
during an execution of inertial running in which the engine is stopped to allow a vehicle to run with inertia, the vehicle controlling system starts the engine by the starting device based on a vehicle speed, and changes a predetermined vehicle speed,
power consumed by the power steering device is changed in response to a vehicle speed, and
the predetermined vehicle speed, when a power supply capability of the electric storage device is low, is a vehicle speed higher than the predetermined vehicle speed when the power supply capability of the electric storage device is high, and
the predetermined vehicle speed is:
(i) a lower limit vehicle speed in a vehicle speed range in which the electric storage device can output power consumed by the starting device when the engine is started and power consumed by the power steering device at the same time, or
(ii) a vehicle speed close to the lower limit vehicle speed in the vehicle speed range.
2. The vehicle controlling system according to claim 1, wherein the vehicle speed range is a range, in which the electric storage device can output power consumed by the starting device and power consumed by the power steering device at the same time, while keeping an output voltage in a voltage range so that an equipment supplied with power from the electric storage device can operate.
3. The vehicle controlling system according to claim 1, wherein the vehicle controlling system prohibits the inertial running when travel conditions including a vehicle speed are in a predetermined inertial running-prohibited region, and
the inertial running-prohibited region increases more when the power supply capability of the electric storage device is low than when the power supply capability of the electric storage device is high.
4. The vehicle controlling system according to claim 3, wherein the lower a power supply capability of the electric storage device is, the more the inertial running-prohibited region increases.
5. The vehicle controlling system according to claim 1, further comprising:
a regeneration device that converts motion energy of the vehicle to electric energy, wherein
when the inertial running is performed, the vehicle controlling system supplies power output by the regeneration device to at least one of the electric storage device, the starting device, and the power steering device, and determines the predetermined vehicle speed based on the power output by the regeneration device.

6. The vehicle controlling system according to claim 4, wherein an output voltage of the regeneration device when the inertial running is performed, is higher than an output voltage of the regeneration device in a travel state other than the inertial running.

7. The vehicle controlling system according to claim 2, further comprising:
   a regeneration device that converts motion energy of the vehicle to electric energy, wherein
   when the inertial running is performed, the vehicle controlling system supplies power output by the regeneration device to at least one of the electric storage device, the starting device, and the power steering device, and determines the predetermined vehicle speed based on the power output by the regeneration device.

* * * * *